United States Patent
Ramachandran (10) Patent No.: US 9,936,383 B2
(45) Date of Patent: Apr. 3, 2018

(54) PROVIDING WIRELESS NETWORK AUTHENTICATION DATA TO CLIMATE CONTROL SYSTEM DEVICES

(71) Applicant: Emerson Electric Co., St. Louis, MO (US)

(72) Inventor: Anil Ramachandran, Sunnyvale, CA (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 14/559,206

(22) Filed: Dec. 3, 2014

(65) Prior Publication Data

US 2015/0156631 A1 Jun. 4, 2015

Related U.S. Application Data

(60) Provisional application No. 61/911,243, filed on Dec. 3, 2013, provisional application No. 61/911,251, filed
(Continued)

(51) Int. Cl.
*H04W 12/06* (2009.01)
*H04W 84/12* (2009.01)
(Continued)

(52) U.S. Cl.
CPC .......... *H04W 12/06* (2013.01); *H04W 4/005* (2013.01); *H04W 8/005* (2013.01); *H04W 84/12* (2013.01); *H04W 84/045* (2013.01)

(58) Field of Classification Search
CPC ... H04W 12/06; H04W 4/005; H04W 84/045; H04W 84/12; H04L 67/12
See application file for complete search history.

(56) References Cited

U.S. PATENT DOCUMENTS

| 8,539,790 B1 | 9/2013 | Budd |
| 8,549,658 B2 | 10/2013 | Kolavennu et al. |

(Continued)

FOREIGN PATENT DOCUMENTS

| KR | 101312968 | 10/2013 |

OTHER PUBLICATIONS

Cisco, "Dynamice VLAN Assignment with Radius Server" http://www.cisco.com/c/en/us/support/docs/wireless-mobility/wireless-vlan/71683-dynamicvlan-config.html. Accessed Dec. 3, 2015, updated Sep. 24, 2012 (hereinafter "Cisco").*
(Continued)

*Primary Examiner* — Vladimir Magloire
*Assistant Examiner* — Donald H Braswell
(74) *Attorney, Agent, or Firm* — Harness, Dickey & Pierce, P.L.C.

(57) ABSTRACT

Disclosed are exemplary embodiments of apparatus and methods for provisioning a wireless-capable climate control system device for a wireless network. In an exemplary embodiment, a method of provisioning a wireless-capable target device for a wireless network includes providing, to the target device, wireless network authentication data for joining the wireless network. The providing is performed using a user-interface-equipped device. The target device attempts to join the wireless network using the wireless network authentication data. In some embodiments the user-interface-equipped device receives a signal from the target device indicating whether the attempt to join the wireless network was successful.

10 Claims, 6 Drawing Sheets

Related U.S. Application Data on Dec. 3, 2013, provisional application No. 61/911,256, filed on Dec. 3, 2013.

(51) Int. Cl.
*H04W 8/00* (2009.01)
*H04W 4/00* (2018.01)
*H04W 84/04* (2009.01)

(56) References Cited

U.S. PATENT DOCUMENTS

| | | | | |
|---|---|---|---|---|
| 8,964,634 B2* | 2/2015 | Jing | .................... | H04L 12/2832 370/328 |
| 2010/0165879 A1 | 7/2010 | Gupta et al. | | |
| 2010/0202345 A1* | 8/2010 | Jing | .................... | H04L 12/2832 370/328 |
| 2014/0376405 A1* | 12/2014 | Erickson | ........... | H04W 52/0212 370/254 |
| 2015/0333965 A1* | 11/2015 | Lee | ........................ | H04L 45/02 370/254 |

OTHER PUBLICATIONS

Canadian Office Action dated Dec. 8, 2015, issued in co-pending Canadian Application No. 2,873,008 which claims priority to the instant application, 5 pgs.

\* cited by examiner

PROVIDING WIRELESS NETWORK AUTHENTICATION DATA TO CLIMATE CONTROL SYSTEM DEVICES

CROSS-REFERENCE TO RELATED APPLICATIONS

This application claims the benefit of U.S. Provisional Application Nos. 61/911,243, 61/911,251 and 61/911,256, all filed on Dec. 3, 2013. The entire disclosures of the above applications are incorporated herein by reference.

FIELD

The present disclosure relates to providing wireless network authentication data to climate control system devices.

BACKGROUND

This section provides background information related to the present disclosure which is not necessarily prior art.

In climate control systems, thermostats, other controllers, monitoring systems and/or monitoring equipment capable of communicating wirelessly may be provided whereby a user, e.g., can select temperature and other climate control settings and/or receive data indicative of system performance. Wireless-capable thermostats and/or various other wireless-capable climate control system devices may communicate, e.g., with a user's home network to receive data from remote sensors in the home. Wireless-capable thermostats, for example, may also be remotely controlled by a user via smart phone, tablet, etc. to manage climate control settings, e.g., when the user is away from home.

SUMMARY

This section provides a general summary of the disclosure, and is not a comprehensive disclosure of its full scope or all of its features.

According to various aspects, exemplary embodiments are disclosed of apparatus and methods for provisioning a wireless-capable target device for a wireless network. In one exemplary implementation, a method of provisioning a wireless-capable target device for a wireless network includes providing, to a target device of a climate control system, wireless network authentication data for joining a wireless network. The providing is performed using a user-interface-equipped device. The target device attempts to join the wireless network using the wireless network authentication data.

In another exemplary implementation, a climate control system device includes a processor, memory, and a wireless network interface configured to receive, from a user-interface-equipped device, wireless network authentication data for joining a wireless network. Using the wireless network authentication data, the climate control system device attempts to join the wireless network.

In another exemplary implementation, a method of provisioning a climate control system target device for a wireless network includes configuring the target device with a capability for authenticating to a network having a pre-designated network name, and changing at least a network name of the wireless network to the pre-designated network name. The target device is thereby made capable of joining the wireless network using at least the pre-designated network name.

In yet another exemplary embodiment, a wireless-capable target device for use in a climate control system includes a processor, memory, and a network interface configured to use at least a pre-designated network name to authenticate the target device for connection in a network having the pre-designated name. The target device is thereby made capable of joining a user network connected with the climate control system, after the user network has been named with the pre-designated network name.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The inventor hereof has recognized that it could be complicated for a user to provision a new wireless-capable device of a climate control system for communication with the user's home network. Such devices can include thermostats, other controllers, climate control system monitoring devices and equipment, etc. that may have limited user interfaces, if any. Thermostats, for example, typically provide menu items and other preset features that may be selected by a user, e.g., by touching a touch screen on the device. But many, if not most, thermostats do not have a keyboard or other interface by which the user might enter additional data. Accordingly, the inventor has developed and discloses herein exemplary embodiments of apparatus, systems, and methods for providing network authentication information to a wireless-capable device of a climate control system for connection in a wireless network. Such a device at times may be referred to in the disclosure and claims as a "target" device. Various implementations of the disclosure are contemplated in relation to target devices that may have limited or non-existent user interface capabilities. Implementations also are possible, however, in relation to a target device that has a keyboard or other data entry component.

In various embodiments, a target device such as a thermostat may be equipped with a network interface that allows the thermostat to connect wirelessly with a computing device, e.g., with a personal computer (PC), laptop computer, smart phone or other computing device having a user interface that allows the user to enter data and to display data. A user may, e.g., use an application made available on the computing device interface to enter authentication information needed by the thermostat to connect with a wireless network, e.g., the user's home network. Additionally or alternatively, if the computing device itself connects to the same wireless network and has the required authentication information, the application may extract this information and communicate it to the thermostat. The thermostat then may use the authentication information to connect to the wireless network, validate success in making the connection, and inform the application of such success, which may then be signaled to the user. It should be noted generally that although example embodiments are described with reference to a thermostat, various types of target devices could be provisioned with authentication information in a wireless network in the same or similar manner. Target devices may include (without limitation) other climate control system controllers, climate control system monitoring devices and equipment, etc.

Figure 1A:
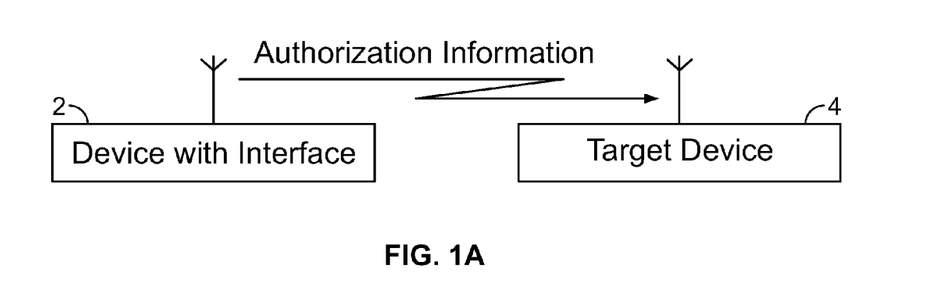
FIGS. 1A-1C are diagrams illustrating how a wireless-capable target device may be provisioned for a wireless network in accordance with example implementations of the present disclosure.
Figure 1B:
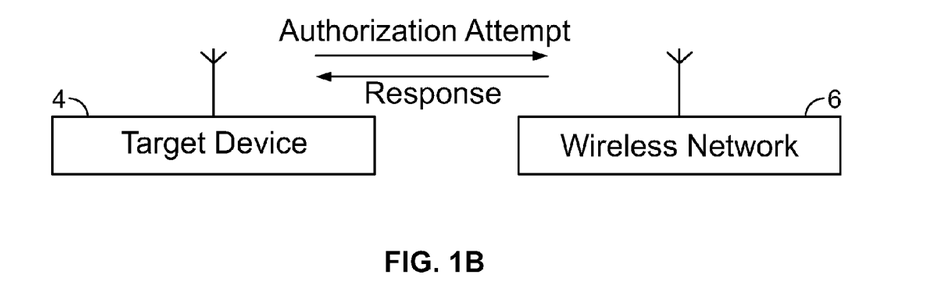
Figure 1C:
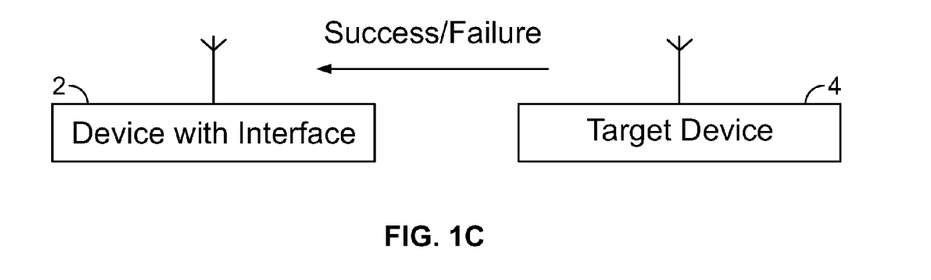

With reference now to the figures, and in various implementations, a wireless-capable target device may be provisioned for a wireless network as shown in FIGS. 1A-1C. As shown in FIG. 1A, a computing device 2 includes a user interface such as a keyboard, touch screen, e.g., that allows data entry and display. The computing device 2 also includes a wireless interface. A wireless-capable target device 4 is equipped with a wireless interface that allows the target device 4 to connect with the computing device 2. Embodiments also are possible in which a wired interface is provided between the computing device 2 and target device 4, e.g., over a USB (universal serial bus) connection. In such embodiments, the target device 4 may communicate with the computing device 2 over the wired interface. The target device 4 may also receive, over the wired interface, power needed by the target device 4 to operate, communicate, and validate that information received from the computing device 2 is appropriate.

As shown in FIG. 1A, the computing device 2 sends authentication data for a wireless network 6 to the wireless-capable target device 4. As shown in FIG. 1B, the target device 4 attempts to join the wireless network 6 using the authentication data. The wireless network 6 responds to the attempt by signaling, e.g., whether or not the target device 4 has been authenticated for connection in the network 6. As shown in FIG. 1C, the user-interface-equipped computing device 2 may receive a signal from the target device 4 indicating whether the attempt to join the wireless network 6 was successful.

Figure 2A:
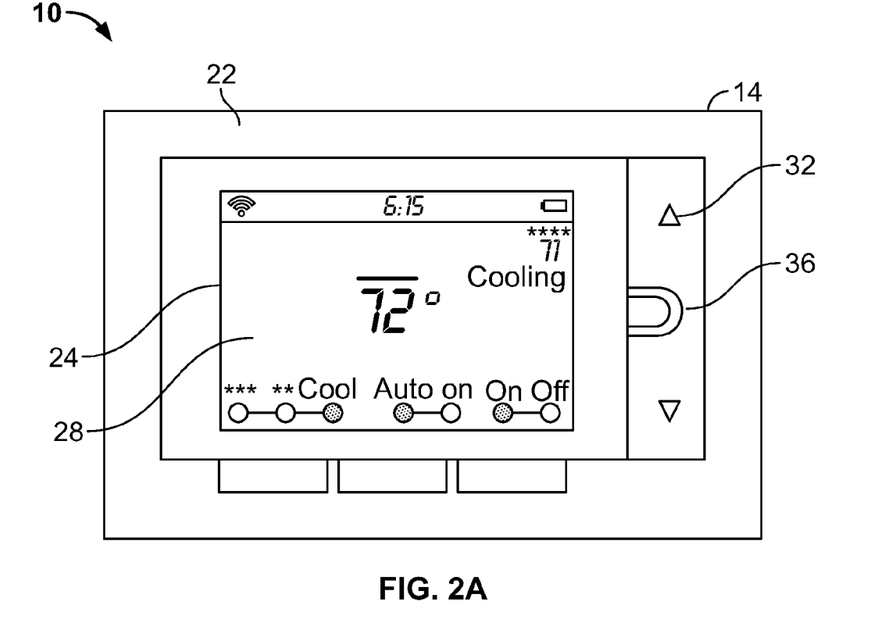
FIGS. 2A and 2B are diagrams of climate control system target devices in accordance with example implementations of the present disclosure.

FIG. 2A illustrates an exemplary embodiment of a wireless-capable target device, e.g., a thermostat 10 embodying one or more aspects of the present disclosure. The thermostat 10 is for controlling a climate control system in a residence. Various aspects of the disclosure, however, could be directed to thermostats configured for use in other structures and/or environments. Additionally or alternatively, various aspects of the disclosure could be directed to wireless-capable devices that are not thermostats. The thermostat 10 may be configured to receive power from one or more power source types, including but not limited to a connection to a climate control system transformer, a power stealing circuit, one or more batteries, etc.

The thermostat 10 has a housing 14 with a front cover 22 and includes a display device 24 having a display screen 28, which may be a touch screen. The display screen 28 is configured to indicate various environmental conditions detected in the residence, to show various settings that have been programmed into the thermostat 10, and to provide an interface whereby a user, e.g., an owner of the residence, may enter and/or change such settings. The display screen 28 is, e.g., a segmented display. A plurality of setting options 32 may be touch-selected by the user. A menu button 36 may be touched to provide a number of menu items for user selection. No keyboard or other means are provided whereby a user may affirmatively provide data to the thermostat 10. In some implementations, as further described below, a user may initiate a process of pairing the thermostat 10, e.g., with the user's home network in order to provision the thermostat 10 for wireless communication with the home network.

Figure 2B:
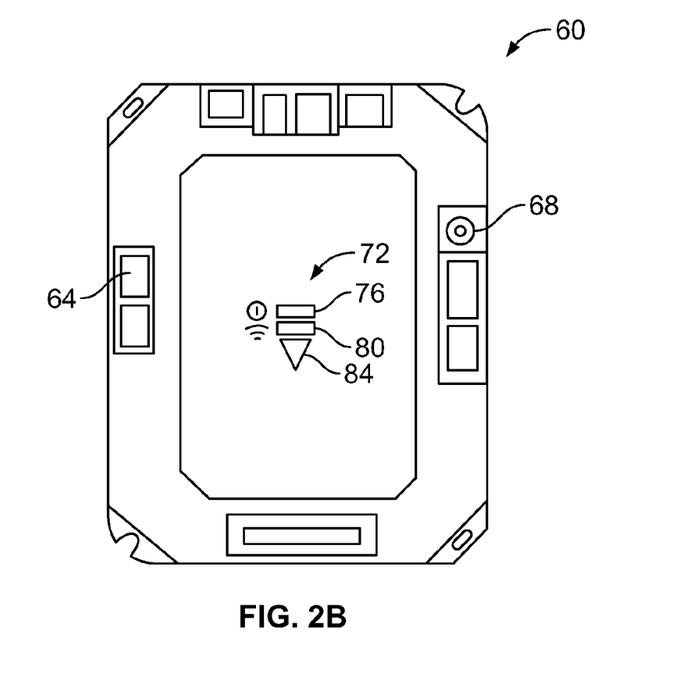

FIG. 2B illustrates another exemplary embodiment of a wireless-capable target device, e.g., a HVAC monitoring system data hub 60 embodying one or more aspects of the present disclosure. The data hub 60 is a wireless-capable device and also includes a plurality of connection ports 64. When the data hub 60 is installed e.g., in a residential climate control system, connected with various climate control system sensor inputs and configured for wireless communication, the data hub 60 may receive a plurality of sensor data signals from various HVAC components of the climate control system and transmit the data wirelessly to a remotely located HVAC monitoring service for analysis. The data hub 60 includes a push button 68 and a plurality of indicator lights 72, including a power indicator 76, a wireless connectivity indicator 80, and a monitoring service connectivity indicator 84. No keyboard or other means are provided on the data hub 60 whereby a user may enter additional data. In some implementations as further described below, a user may activate the push button 68 to initiate a process of pairing the data hub 60, e.g., with the user's home network in order to provision the data hub 60 for wireless communication with the home network and the HVAC monitoring service.

Figure 3:
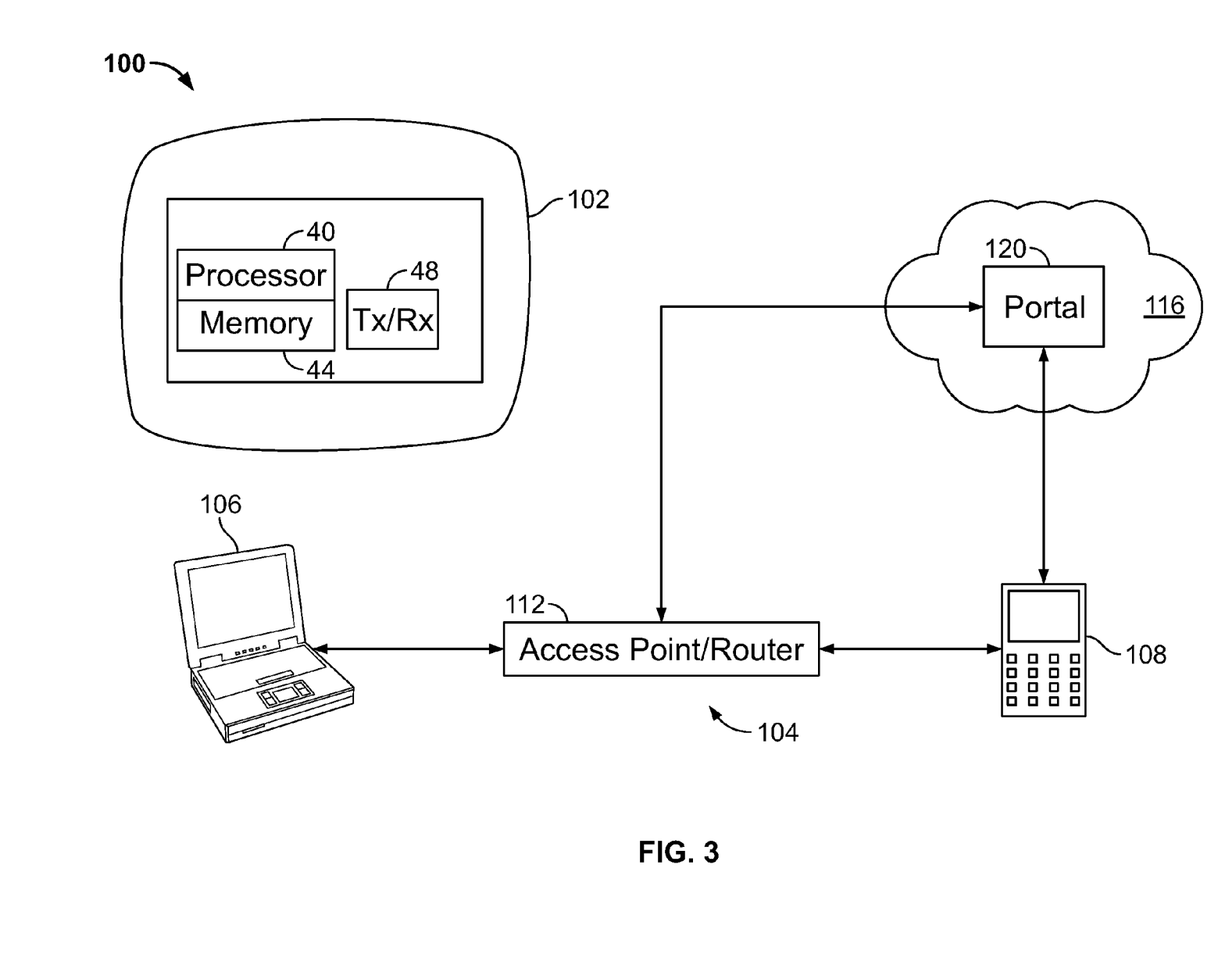
FIG. 3 is a diagram of a home network in accordance with one example implementation of the present disclosure.

FIG. 3 shows an example network 100 and one embodiment of a target device 102 to be provisioned in accordance with an example implementation of the present disclosure. The target device 102, e.g., the thermostat 10 or data hub 60, includes a microprocessor 40 and memory 44. The target device 102 is capable of performing wireless communication through a network interface 48. In various implementations, the target device 102 can be provisioned, as described below, for wireless communication in the network 100, e.g., a home network of the user. At least one wireless-enabled user device 104 is connectible in the network 100 and may include, e.g., a laptop computer 106 and/or a smart phone 108. User devices 104 may additionally or alternatively include, e.g., home computers, personal computers (PCs), tablets, etc. The network 100 may also include, for example and without limitation, an access point/router 112 in communication with a wide-area network (WAN), e.g., the Internet 116.

In various embodiments the home owner may have a user account, e.g., with an energy management service or utility. The home owner may use such an account, e.g., to track and/or manage energy usage in the home. In various embodiments the user account is accessible through a web portal 120. Thus the home owner may use, e.g., the smart phone 108 and/or laptop computer 106 to remotely and/or locally track and/or manage energy usage in the home through the target device 102, after the target device 102 has been connected in the network 100 and associated with the user's account.

Various embodiments of the disclosure may be directed to a target device (such as a wireless thermostat, controller, etc.) and a user-interface-equipped computing device (such as a PC, laptop, etc.) that are both capable of accessing the same physical wireless communication medium. One example method of provisioning a target device such as a thermostat is indicated generally in FIG. 4 by reference number 200. In the present example implementation, performance of the method 200 shall be described with reference to the network 100, target device 102 and one of the user devices shown in FIG. 3, e.g., the laptop computer 106. The method, however, could be performed using the smart phone 108 or other wireless user device 104 that has a user interface.

Figure 4:
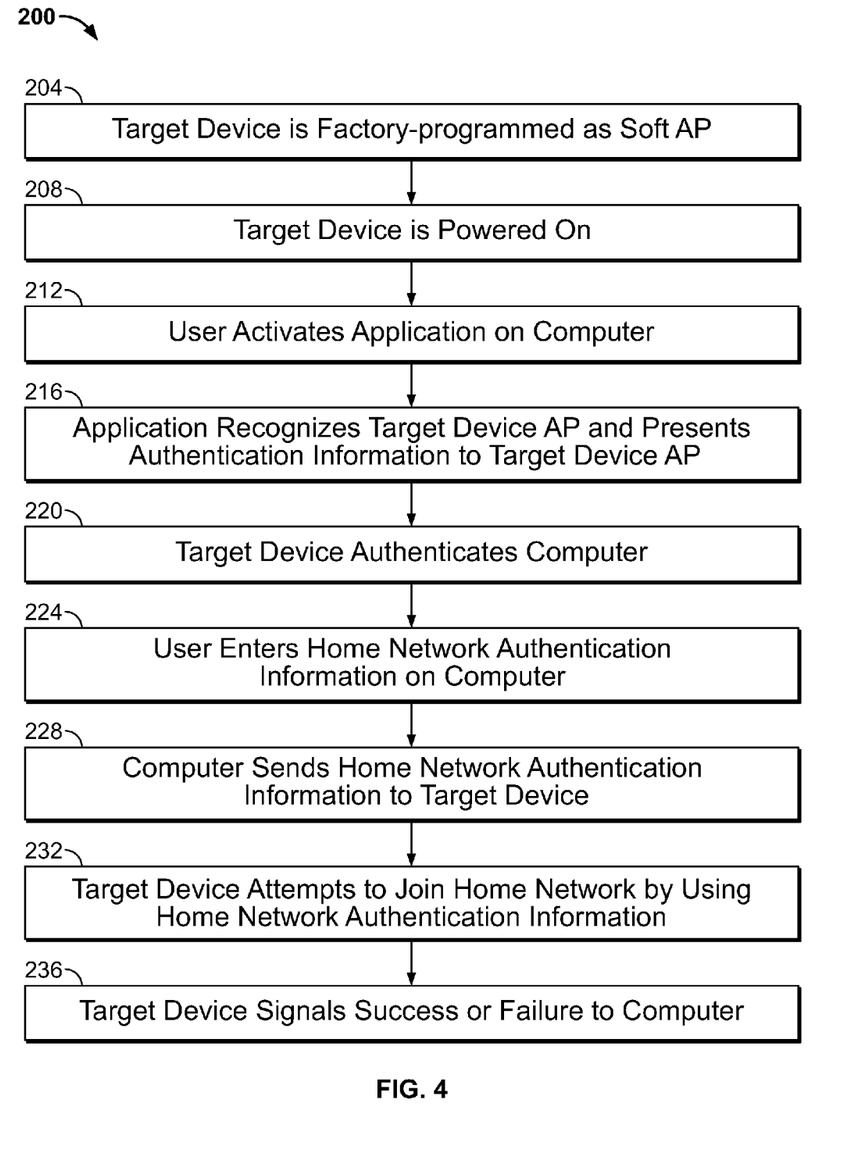
FIGS. 4-6 are flow diagrams of methods of provisioning a target device of a climate control system in accordance with example implementations of the present disclosure.

In process 204 the target device 102 is factory-programmed with a predefined authentication setup. For example, the memory 44 of the target device 102 may be configured with executable software that enables the target device 102 to perform as a "soft" access point (soft AP). Additionally, a software application is made available to a purchaser of the target device 102, e.g., for execution on or through the user's laptop computer 106, smart phone 108, or other computing device that has a user interface. The application is configured to provide authentication information including, e.g., a network name (also known as a service set identification (SSID)) and password, for connecting with the target device 102 soft AP. Additionally or alternatively, in various embodiments a card or other notification may be included with the target device 102 when the target device 102 is purchased. The notification may provide the authentication information for connecting with the target device 102 via the soft AP.

In some embodiments, the laptop computer 106 is used to access the software application. For example, the user may download the software application to the laptop computer 106, e.g., from the web portal 120. Additionally or alternatively, the laptop computer 106 may access the software application as a web service through the web portal 120, etc. In some embodiments, the software application is made available through a user energy management account with an energy management service, e.g., through the web portal 120.

In process 208 the target device 102 is powered on. In process 212 the user accesses the software application, e.g., on the user's laptop 106 and runs the application. In process 216 the software application provides the laptop computer 106 with the authentication information whereby the laptop computer 106 may be authenticated to and connect with the target device 102 soft AP. In some implementations, e.g., where the authentication information has been provided in a notification accompanying the target device 102 at purchase, the user may enter the authentication information via the laptop 106 keyboard. In process 220 the target device 102, performing as AP, authenticates the laptop computer 106 and allows the laptop computer 106 to connect with the target device 102. In process 224 the user enters authentication information (e.g., SSID and password) for the home network 100 on the laptop computer 106, e.g., via the laptop keyboard.

In process 228 the laptop computer 106 is instructed, e.g., by the software application, to send the authentication information for the home network 100 to the target device 102. Alternatively, where the laptop computer 106 is connected with the home network 100, the software application may automatically extract the home network authentication information from the laptop computer 106 and send it to the target device 102. In process 232 the target device 102 attempts to connect with and authenticate to the home network 100, e.g., through the AP/router 112, by using the authentication information received from the laptop computer 106. In attempting to connect with the home network 100, the target device 102 may disconnect from the laptop computer 106 if need be (e.g., if the same radio is used for connecting the target device 102 in both the soft AP network and the home network 100).

In process 236 the target device 102 informs the laptop computer 106 as to whether or not the target device 102 connected successfully with the home network 100. In order to inform the laptop computer 106, the target device 102 may disconnect from the home network 100 and reconnect to the laptop computer 106 over the AP network if need be. Additionally or alternatively, embodiments are possible in which a user-interface-equipped device connects, e.g., with the Internet via a local wireless network, cellular network, etc. when a target device is no longer in soft AP mode, and checks with an appropriate server to determine whether or not the target device connected successfully with the wireless network. In various embodiments a user-interface-equipped device may connect with a local wireless network and perform discovery on the local wireless network to discover whether the target device responds. In some embodiments, a user may be requested to check a target device's user interface (which may be somewhat limited, as previously discussed) for an indication as to whether or not the target device connected successfully with the wireless network. Additionally or alternatively, embodiments are possible in which a target device includes a wireless interface allowing the target device to perform in AP mode and station mode at the same time. In such embodiments, the target device may attempt to connect with a target wireless network while still in soft AP mode, and may report success to a user-interface-equipped device while the target device is still connected with the wireless network.

Thus in various embodiments, authentication information for joining the home network 100 is provided to the target device 102, and substantially immediate confirmation of successful connection may be obtained. Additionally, in various implementations, communications among the laptop computer 106, target device 102 and home network 100, e.g., for provisioning the target device 102, may be encrypted to prevent unauthorized access to information being communicated.

In some embodiments, a user wishing, e.g., to provision a target device such as a thermostat for the user's home wireless network may use an application made available on the computing device user interface to allow the user's home network to authenticate the target device. In some embodiments, authentication information for joining a wireless network is provided by the target device. One example method of provisioning a target device such as a thermostat is indicated generally in FIG. 5 by reference number 300. In the present example implementation, performance of the method 300 shall be described with reference to the network 100, target device 102 and one of the user devices shown in FIG. 3, e.g., the laptop computer 106. The method, however, could be performed using the smart phone 108 or other wireless user device 104 that has a user interface.

Figure 5:
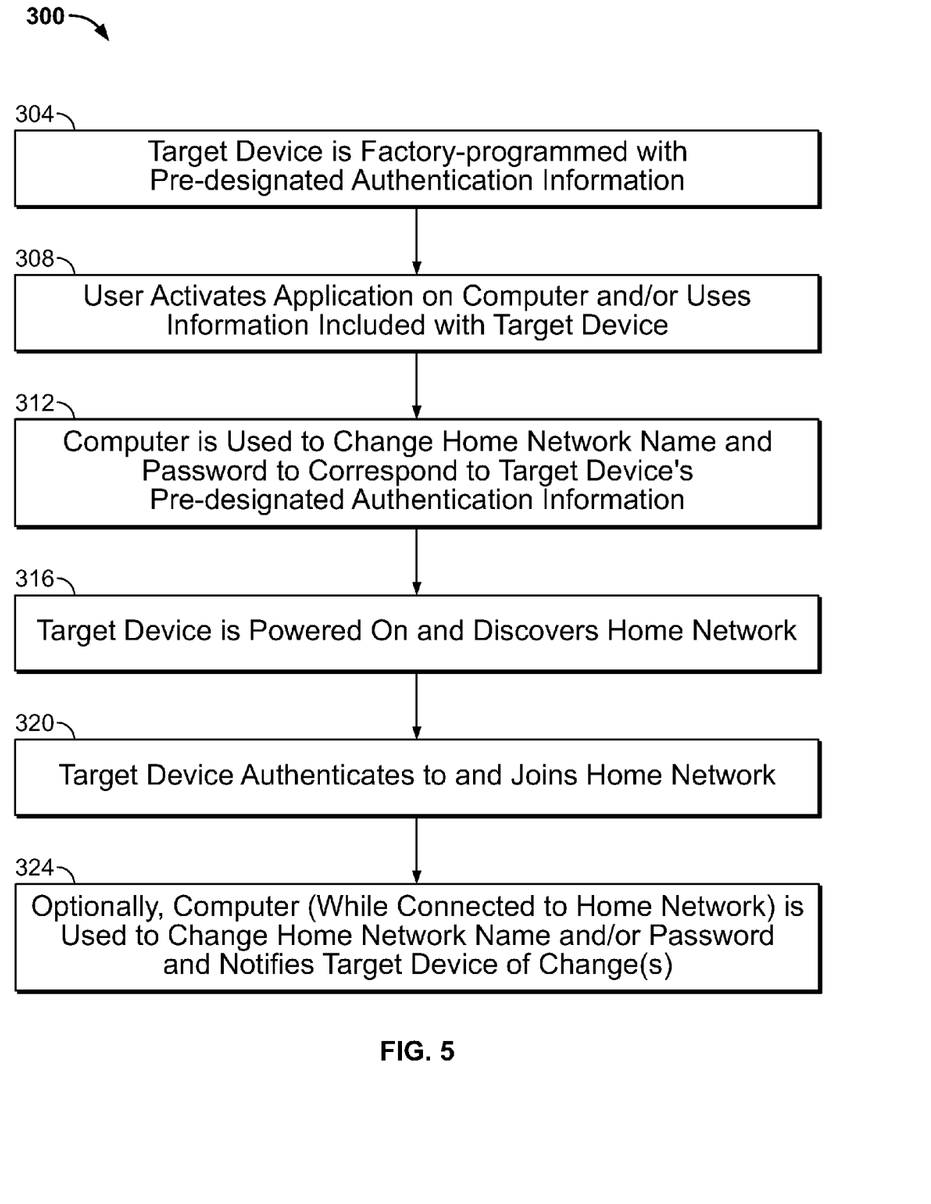

In process 304 the target device 102 is factory-programmed with a predefined authentication setup. For example, the memory 44 of the target device 102 may be configured with executable software by which the target device 102 may use a pre-designated set of authentication information to connect with and authenticate to a network that is yet to be identified. The target device 102 may be configured, e.g., to send a password "A" to join a yet-to-be-identified network for which the network name (i.e., service set identification (SSID)) is "X." Additionally, a software application may be made available to a purchaser or other user of the target device 102, e.g., for execution on or through the user's laptop computer 106, smart phone 108, or other computing device that has a user interface. In some embodiments, the laptop computer 106 is used to access the software application. For example, the user may download the software application to the laptop computer 106, e.g., from the web portal 120. Additionally or alternatively, the laptop computer 106 may access the software application as a web service through the web portal 120, etc. In some embodiments, the software application is made available through a user energy management account with an energy management service, e.g., through the web portal 120. Additionally or alternatively, in various embodiments, a card or other notification may be included with the target device 102 when the thermostat 10 is purchased. The notification may describe the target device's pre-designated set of authentication information.

In various embodiments, the laptop computer 106 may be configured, e.g., by the software application, to perform actions that allow the target device 102 to connect with and authenticate to, e.g., an actual network having the network name "X". Referring again to FIG. 5, in process 308 the user may access the software application, e.g., on the user's laptop computer 106 that is connected with and authenticated to the user's home network 100. In process 312 the laptop computer 106 changes the network name of the home network 100 from its current name to the network name "X" pre-designated in the target device 102. The laptop computer 106 also changes the password for the home network 100 from its current setting to the password "A" pre-designated in the target device 102. Additionally or alternatively, and referring again to process 308, where a notification describing the target device's pre-designated set of authentication information was included with the target device 102 at purchase, the user may use the information to manually change the home network configuration. In process 316 the target device 102 is powered on and detects the home network 100, which is currently named "X." In process 320 the target device 102 uses the password "A" to connect with the home network 100, which authenticates the target device 102. In such manner, the target device 102 may be provisioned to the user's home network 100.

In optional process 324 the laptop computer 106, which is connected with the home network 100, may be instructed by the software application to change at least the network name and password of the home network 100 back to their previous values, or in some embodiments, to change at least the network name and/or password to different value(s). Such changes are made after the target device 102 has joined the home network 100. Alternatively, the user may manually change the network name and/or password of the home network 100 back to their previous value(s), or to different value(s), after the target device 102 has joined the home network 100. The target device 102 is notified of such changes and thereafter may use the changed network name and/or changed password to connect to the home network 100.

Figure 6:
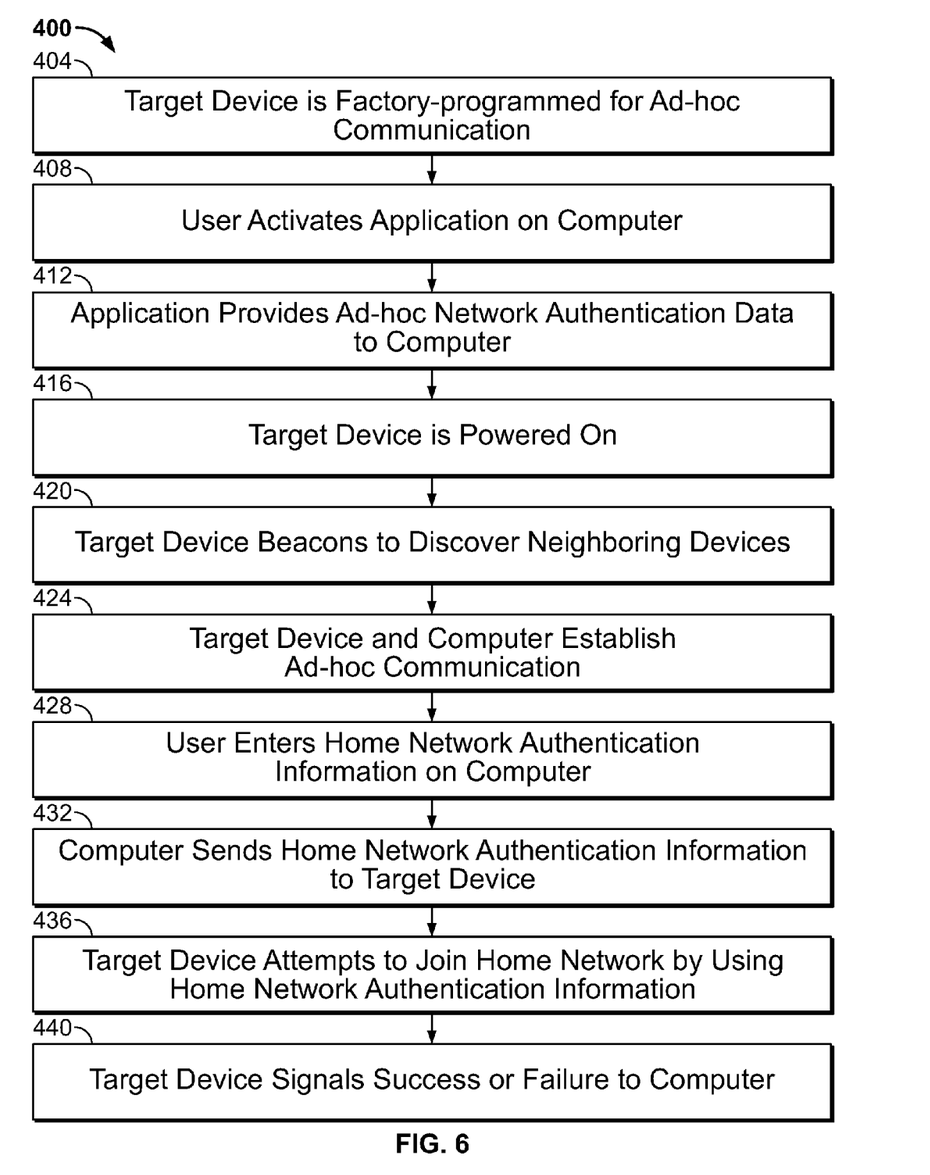

Another example method of provisioning a target device such as a thermostat is indicated generally in FIG. 6 by reference number 400. In the present example implementation, performance of the method 400 shall be described with reference to the network 100, target device 102 and one of the user devices shown in FIG. 3, e.g., the laptop computer 106. The method, however, could be performed using the smart phone 108 or other wireless user device 104 that has a user interface.

In process 404 the target device 102 is factory-programmed with a predefined authentication setup. For example, the memory 44 of the target device 102 may be configured with executable software that enables the target device 102 to discover and communicate with neighboring devices in an ad-hoc network. Additionally, a software application is provided to a purchaser of the target device 102, e.g., for execution on or through the laptop computer 106, smart phone 108, or other computing device that has a user interface. The application is configured to provide authentication information including, e.g., a network name (also known as a service set identification (SSID)) and password, for the ad-hoc network. In some embodiments, the laptop computer 106 is used to access the software application. For example, the user may download the software application to the laptop computer 106, e.g., from the web portal 120. Additionally or alternatively, the laptop computer 106 may access the software application as a web service through the web portal 120, etc. In some embodiments, the software application is made available through a user energy management account with an energy management service, e.g., through the web portal 120. Additionally or alternatively, in various embodiments, a card or other notification may be included with the target device 102 when the target device 102 is purchased. The notification may provide the authentication information for connecting with the target device 102 in ad-hoc mode.

In process 408 the user accesses the software application, e.g., on the user's laptop computer 106 and runs the application. In process 412 the software application provides the laptop computer 106 with the authentication information whereby the laptop computer 106 may be authenticated to and connect with the target device 102 in ad-hoc mode. Additionally or alternatively, in some implementations, e.g., where the authentication information has been provided in a notification accompanying the target device 102 at purchase, the user may enter the authentication information via the laptop 106 keyboard.

In process 416 the target device 102 is powered on. In process 420 the target device 102 transmits beacons to discover neighboring device(s). Such device(s) may include the laptop computer 106, which also may be beaconing in ad-hoc mode. In process 424, ad-hoc connectivity is established between the laptop computer 106 and the target device 102. Specifically and for example, the laptop computer 106 responds to the target device 102 (and/or vice versa). The laptop computer 106 sends the ad-hoc network authentication information to the target device 102, and the target device 102 authenticates the laptop computer 106.

In process 428 the user enters authentication information (e.g., SSID and password) for the home network on the laptop computer 106, e.g., via the laptop computer keyboard. In process 432 the laptop computer 106 is instructed, e.g., by the software application, to send the home network authentication information to the target device 102. Alternatively, where the laptop computer 106 is connected with the home network 100, the software application may automatically extract the home network authentication information from the laptop computer 106 and send it to the target device 102. In process 436 the target device 102 attempts to connect with and authenticate to the home wireless network 100, e.g., through the AP/router 112, by using the authentication information received from the laptop computer 106. In process 440 the target device 102 informs the laptop computer 106 whether or not the target device 102 connected successfully with the home network 100. Thus, authentication information for joining the home network is provided to the target device 102, and substantially immediate confirmation of successful connection may be obtained. In various implementations, communications among the laptop computer 106, target device 102 and home network 100 may be encrypted to prevent unauthorized access to information being communicated.

Embodiments of the foregoing apparatus and methods make it possible for a user to connect essentially any currently available wireless device that has no user interface to a wireless network, in ways that are substantially secure and that provide substantially immediate feedback as to whether the connection was successful. Connections can be made more quickly, smoothly and cost-effectively than through the use of most current methods, e.g., many methods involving USB mass storage. Such methods typically require a device to be a host, may require the payment of a royalty, and do not provide immediate verification of successful connectivity and/or accuracy of the information.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of provisioning a wireless-capable target device for a wireless network, the method comprising:
   providing a first WiFi wireless network for communication, in a climate control system, of sensor data sensed by one or more climate control system devices;
   providing power to a target climate control system device, the target climate control system device having been manufacturer-programmed to perform, upon being provided with power, as a soft access point for the first WiFi wireless network for recognition by a user device and for access by the user device to the first WiFi wireless network initiated by the target climate control system device;
   prompting the user device to send, to the target climate control system device, information for authenticating the user device in the first WiFi wireless network;
   authenticating and connecting, by the target climate control system device, the user device to the first WiFi wireless network based on the information;
   sending, by the authenticated and connected user device, connection and authentication data for a second WiFi wireless network to the target climate control system device via the first WiFi wireless network; and
   attempting, by the target climate control system device, to join the second WiFi wireless network using the sent second WiFi wireless network connection and authentication data;
   the target climate control system device further operable, after having joined the second WiFi wireless network, to transmit sensor data sensed by and/or received by the target climate control system device in the climate control system for control of the climate control system via the second WiFi wireless network.

2. The method of claim 1, further comprising using, by the user, a user interface of the user device to enter and send the information for authenticating the user device in the first WiFi wireless network.

3. The method of claim 1, further comprising accessing a user energy management account with an energy management service to obtain the information for authenticating the user device in the second WiFi wireless network.

4. The method of claim 1, further comprising encrypting the information and the data.

5. The method of claim 1, wherein the target climate control system device includes one or more of the following: a thermostat, a climate control system controller, a climate control system monitoring device, and climate control system monitoring equipment.

6. The method of claim 1, wherein the user device receives a signal from the target climate control system device indicating whether the attempting to join the second WiFi wireless network was successful.

7. A target climate control system device comprising a processor, memory, and a wireless network interface configured to:
   upon receiving power and before being authenticated to a second WiFi wireless network for communication, in a climate control system, of sensor data sensed by one or more climate control system devices, initiate beaconing as a first WiFi wireless network node;
   receiving, from a neighboring user-interface-equipped device, information for authenticating the user-interface-equipped device to the first WiFi wireless network for communication with the target climate control system device;
   authenticating and connecting with the user-interface-equipped device in an ad-hoc mode based on the information to the target climate control system device;
   receiving connection and authentication data for the second WiFi wireless network from the user-interface-equipped device in the ad-hoc mode from the user-interface-equipped device;
   attempting, by the target climate control system device, to loin the second WiFi wireless network using the received connection and authentication data;
   the target climate control system device further operable, after having joined the user wireless network, to transmit sensor data sensed by and/or received by the target climate control system device in the climate control system for control of the climate control system via the wireless network.

8. The target climate control system device of claim 7, wherein the processor, memory, and wireless network interface are further configured to receive the connection and authentication data entered via a user interface of the user-interface-equipped device.

9. The target climate control system device of claim 7, comprising one or more of the following: a thermostat, a climate control system controller, a climate control system monitoring device, and climate control system monitoring equipment.

10. The target climate control system device of claim 7, further configured to send a signal to the user-interface-equipped device indicating whether the attempting to join the second WiFi wireless network was successful.

* * * * *